US010797947B2

(12) United States Patent
Heimes et al.

(10) Patent No.: US 10,797,947 B2
(45) Date of Patent: Oct. 6, 2020

(54) INITIALIZATION AND CONFIGURATION OF END POINT DEVICES USING A MOBILE DEVICE

(71) Applicant: BAE Systems Controls Inc., Endicott, NY (US)

(72) Inventors: Felix O. Heimes, Endwell, NY (US); Gerald M. Brennan, Endicott, NY (US)

(73) Assignee: BAE Systems Controls Inc., Endicott, NY (US)

(*) Notice: Subject to any disclaimer, the term of this patent is extended or adjusted under 35 U.S.C. 154(b) by 134 days.

(21) Appl. No.: 15/978,840

(22) Filed: May 14, 2018

(65) Prior Publication Data

US 2018/0337822 A1 Nov. 22, 2018

Related U.S. Application Data

(60) Provisional application No. 62/507,859, filed on May 18, 2017.

(51) Int. Cl.
*H04L 12/24* (2006.01)
*H04W 8/26* (2009.01)
(Continued)

(52) U.S. Cl.
CPC ...... *H04L 41/0806* (2013.01); *H04L 12/2807* (2013.01); *H04L 61/20* (2013.01);
(Continued)

(58) Field of Classification Search
CPC ....... H04W 4/80; H04W 84/18; H04W 8/005; H04W 4/50; H04L 41/08; H04L 41/0803;
(Continued)

(56) References Cited

U.S. PATENT DOCUMENTS

| 4,680,583 | A  | * | 7/1987 | Grover    | H04L 12/403 |
|           |    |   |        |           | 340/9.16    |
| 6,175,867 | B1 | * | 1/2001 | Taghadoss | H04L 29/12009 |
|           |    |   |        |           | 370/401     |
| 6,529,498 | B1 | * | 3/2003 | Cheng     | H04L 12/185 |
|           |    |   |        |           | 370/351     |

(Continued)

OTHER PUBLICATIONS

Archana Arudkar et al., "Sender Authentication with Transmission Power Adjustment Method Using RSSI in Wireless Sensor Network", International Journal of Modern Engineering Research, Jul.-Aug. 2013, pp. 1935-1938, vol. 3, Issue 4.

*Primary Examiner* — Kevin C. Harper
(74) *Attorney, Agent, or Firm* — Scully Scott Murphy & Presser PC; Scott J. Asmus

(57) ABSTRACT

Method and system for assigning addresses to end point devices in a network includes placing a mobile device in close proximity to a first end point device and establishing a wireless connection, transmitting an auto-addressing command from the mobile device to the end point device in response to the connection being established and disconnecting the connection in response to the end point device being configured with the network address. As the mobile device is moved through the system, when the wireless signal strength between the mobile device and a respective the end point device exceeds a threshold, both devices recognize that they are in close proximity and the mobile device transfers the address configuration information to the end point device. By moving the mobile device through the system the steps are automatically repeated until the mobile device assigns address and location information to each end point device on the network. The initialization process also involves assigning personality information to end devices that define particular behaviors that the end devices shall assume in the configured system.

33 Claims, 5 Drawing Sheets

(51) Int. Cl.
  *H04W 76/10* (2018.01)
  *H04W 4/80* (2018.01)
  *H04W 4/50* (2018.01)
  *H04W 8/00* (2009.01)
  *H04L 29/12* (2006.01)
  *H04L 12/28* (2006.01)
  *H04W 84/18* (2009.01)

(52) U.S. Cl.
  CPC ........... *H04L 61/2038* (2013.01); *H04W 4/50* (2018.02); *H04W 4/80* (2018.02); *H04W 8/005* (2013.01); *H04W 8/26* (2013.01); *H04W 76/10* (2018.02); *H04W 84/18* (2013.01)

(58) Field of Classification Search
  CPC ............. H04L 41/0806; H04L 12/2807; H04L 29/12009; H04L 29/12207; H04L 29/12254; H04L 29/12603
  See application file for complete search history.

(56) References Cited

U.S. PATENT DOCUMENTS

| | | | |
|---|---|---|---|
| 7,657,255 B2 | 2/2010 | Abel et al. | |
| 7,835,734 B2 | 11/2010 | Eckert et al. | |
| 8,886,214 B2 | 11/2014 | Young | |
| 9,160,742 B1 | 10/2015 | Ackerman et al. | |
| 2006/0212163 A1* | 9/2006 | Ko | B65G 37/02 700/213 |
| 2011/0287795 A1* | 11/2011 | Cahill | H04L 5/0005 455/509 |
| 2014/0068717 A1 | 3/2014 | Mayes et al. | |
| 2014/0181955 A1* | 6/2014 | Rosati | G06F 21/44 726/18 |
| 2014/0270306 A1* | 9/2014 | Luna | H04R 3/00 381/334 |
| 2015/0138597 A1* | 5/2015 | Koshigaya | H04N 1/00973 358/1.15 |
| 2016/0099832 A1* | 4/2016 | Alshinnawi | H04W 4/80 |
| 2016/0344570 A1* | 11/2016 | Ong | H04L 41/12 |
| 2018/0034707 A1* | 2/2018 | Aoki | H04W 8/005 |

* cited by examiner

INITIALIZATION AND CONFIGURATION OF END POINT DEVICES USING A MOBILE DEVICE

FIELD OF DISCLOSURE

The present disclosure relates to configuration of end point devices in a network and more particularly to wireless initialization and configuration using a mobile device.

BACKGROUND

A network of end point devices having many nodes requires significant human effort or wiring to configure the individual addresses and location assignments of the nodes. This is applicable to many platforms such as machines in a smart factory and on vehicles such as trains, aircraft, automobiles and ships. For example, in an aircraft, special wiring is normally used for this purpose. These wires are only needed once when the system is built but they remain on the aircraft for its life. Other methods tend to require significant human effort to perform the address configuration.

Many systems are constructed as a network of end point devices that are connected together through some form of wired or wireless communication links. In this type of system, the end devices are installed at specific locations and they need to be addressed such that a central controller can communicate with individual items at known locations. One such example is an aircraft cabin management system. In the cabin management system, a central controller interfaces with indicators and inputs at specific row and seat locations. The controller needs to communicate with the end point devices that are located at specific locations in the cabin. For example, when a passenger pushes the attendant call button in row 31, seat A, the local controller must inform the central controller at which location the button press occurred. For this functionality to work, each end point device needs a unique identification number and/or address such that the central controller can understand the location from which messages originate or to send messages to a specific location. This capability applies to aircraft cabins and also many other classes of networked control systems.

The need therefore exists to configure a system when it is constructed or retrofit such that each end point device is assigned a unique address and the central controller is configured to understand at which location each end point device is installed. There are several methods for achieving addressing of multiple units in networked control architecture. One such method is to utilize dip switches to mechanically set an address on each device. Another method is to connect to each device independently with a maintenance aid and manually assign an address through a serial communication port. Still another method is to utilize a token wire whereby each device on the network is connected via a discrete signal to the next item in the line. With the token approach each device can signal the next device down the line one at a time to configure the sequence of units.

All of these methods described above are undesirable since they either require a non-trivial amount of human effort, or they require extra wiring to connect all the devices in series. A method to auto address all the items in the system is needed that does not require wires and can allow error free addressing of the system with minimal human effort. During the configuration process each individual item is assigned a network address and the main controller is initialized to correlate the network address to the location that the devices resides in the structure. Another part of the configuration process is to initialize each end device with particular personality and/or security settings.

A system may have several different types of end-devices that have different personality needs. Examples of such items might be ceiling lights and sidewall lights, or a center versus side seating sections. A light that is in the ceiling may react differently to scene commands than a side wall light. A center section overhead controller may service four seats while a side section controller may service three seats. During the process of assigning address and location to end devices each end device is also assigned with its individual personality and security settings.

Typically, configuration initialization is achieved by using unique data buses for devices of different personality. There might be one daisy chained wired data bus that connects the lights in the ceiling and another database that connects the lights in the sidewall. After all the devices are addressed, the main controller can then write specific configuration information (such as personality and security settings) to each individual device. The port that these devices are connected to would usually be one key way to control or configure different personality or security settings.

In a wirelessly controlled system, all the devices communicate over the same wireless network and there are not specific physical ports for different types of end devices.

SUMMARY

In one embodiment, a computer implemented method for assigning addresses and configuring a plurality of end point devices in a network is disclosed. The method starts with placing a mobile wireless device in close proximity to a first end point device of a plurality of end point devices and establishing a first wireless connection between the first end point device and the mobile wireless device. The mobile device then performs transmitting a first auto-addressing command from the mobile wireless device to the first end point device in response to the first wireless connection being established, the first auto-addressing command including information to configure the first end point device with a first network address and disconnecting the first wireless connection in response to receiving indicating that the first end point device is configured with the first network address. In addition to configuring the address of the device, other types of configuration information may be transmitted from the mobile device to the end device including security keys and personality traits. The above steps are repeated until each of the plurality of end point devices is configured with a network address and other parameters. Therefore, the initialization and configuration approach defined in this disclosure will install configuration settings to each end device at the same time that it is assigning address and location.

The wireless device works on the premise that an operator will utilize a display on the device to initiate the configuration process. The display will allow the operator to select the type of end-device that will be initialized, and will allow the operator to begin and end the initialize process. The process also requires that the operator start the process at the first item and progress sequentially toward the last item. While moving from first to last, the operator must place the mobile device close to each end device and wait for a visual or aural indication that each individual device has been recognized and initialized. The mobile device keeps track of the number of end devices it has initialized such that each subsequent device is initialized with the next address and location.

One example embodiment of the present disclosure uses a wireless signal strength such as RSSI between the mobile device and the plurality of end point devices to perform the address configuration. As the mobile device is moved through the system by an operator, the mobile device assigns address and location information to each end point device. When the signal strength exceeds a threshold, both devices recognize that they are in close proximity and the mobile device transfers the address and other configuration information to the node. There are several pieces of information that may be transferred, such as, node address, location, type and security keys. The approach eliminates token wiring and requires minimal manual effort.

The disclosed method eliminates token wiring and achieves the goal of addressing all of the end point devices in the network with minimal manual effort. It also provides a method to distribute security keys in a secure manner. The security keys are stored in a small device such as a SIM card that may be physically secured to prevent unauthorized access.

The mobile device in one example includes a user interface to allow the operator to control the system. In another example manual interface such as buttons are used.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
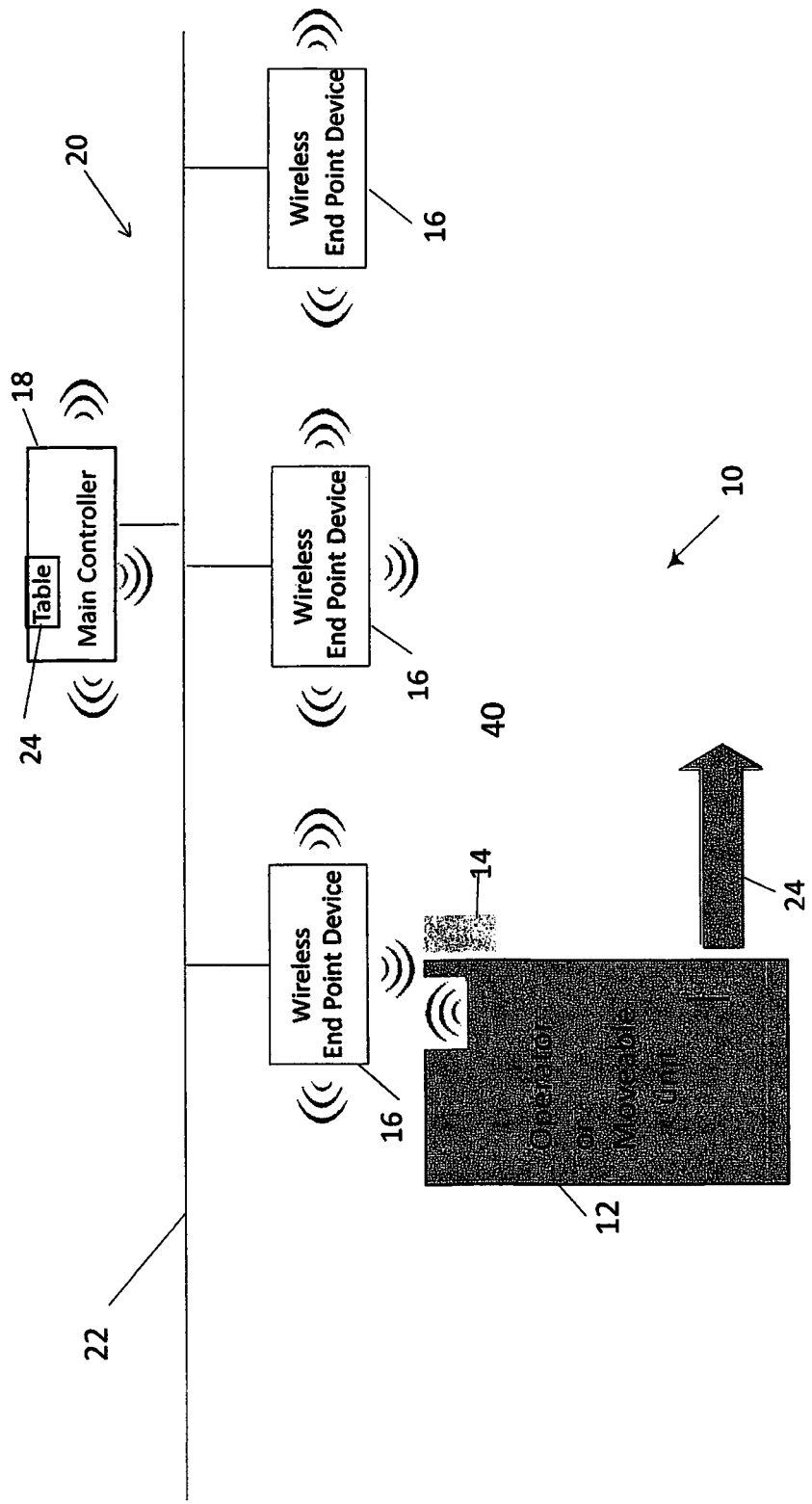
FIG. 1 is perspective view of a wireless system of configuring network nodes, in accordance with certain of the embodiments disclosed herein.

Although the following Detailed Description will proceed with reference being made to illustrative embodiments, many alternatives, modifications, and variations thereof will be apparent to those skilled in the art.

DETAILED DESCRIPTION

This disclosure provides techniques for assigning addresses to and configuring a plurality of end point devices or nodes on a network. In one embodiment, a method to quickly assign addresses to end point devices in a wireless control system is disclosed. In one embodiment, the method utilizes a mobile device, including a handheld or mobile wireless device that will wirelessly assign an address to each end point device on the network. In addition to configuring the address of the device, other types of configuration information may be transmitted from the mobile device to the end device including security keys and personality traits. In one embodiment, the method operates on the principal of a wireless signal strength value, such as Receiver Signal Strength Indication (RSSI). The RSSI is a measurement that a wireless device can make when it receives a signal from another wireless device that indicates the strength of the wireless signal. The RSSI level is a maximum when two wireless transceivers are in close proximity and the RSSI level diminishes rapidly as the separate distance increases. When two wireless transceivers move apart the RSSI signal diminishes rapidly. Once the separation distance reaches a specific value, for example 4 feet, the change in RSSI becomes more gradual. RSSI can therefore be used to accurately detect when two wireless devices are in close proximity. In one embodiment, a threshold is set that will indicate when two devices are within a certain distance, for example, 2 feet from each other.

In one embodiment, the system is designed such that each end point device can detect when a mobile wireless device is placed in close proximity. The mobile wireless device will be configured such that when an auto-addressing mode is initiated, the mobile wireless device will send a beacon signal that end point devices will recognize as an auto-addressing command. The auto-addressing command will include a location number that the end point device will store into memory. The end point devices will listen for the auto-addressing command and will interrogate the signal strength of this message. When the mobile wireless device is placed in close proximity to the end point device, the mobile wireless device will be recognized by the end point based on the RSSI, which causes the end point to configure its address by setting its address to the address transmitted from the mobile wireless device. The end point will then send a response to the mobile wireless device to indicate that it has recognized and initialized its local address. Upon receiving this acknowledgement, the mobile wireless device will increment the address count and then start transmitting the new address count.

In another embodiment, the end point devices can send a wireless signal for the mobile wireless device to detect when it is in close proximity with an end point device. When the mobile wireless device detects that it is in close proximity with an end point device, it can send the appropriate commands to the end point device to assign an address and a location on the network.

Referring to FIG. 1, according to one embodiment, a system 10 includes an operator or moveable unit 12 with wireless mobile device 14 either held by the operator or attached to the moveable unit. A plurality of end point devices or nodes 16 are wirelessly connected to a main controller 18 forming a wireless network 20. Power is provided to the devices on the network 20 by power cable 22. In one embodiment, the operator or moveable unit 12 will initiate a configuration mode, such as an auto-addressing setup mode by pushing a button or otherwise indicating a start condition on the wireless mobile device 14. The operator or moveable unit 12 will then place the wireless mobile device 14 in close proximity to one of the end point devices 16. According to one embodiment, a drone, robot, or other moveable platform is used to initiate the processing of the network end point devices 16 whereby the start condition can be automated such as by a measured distance from the end point device 16 to the wireless mobile device 14, the RSSI strength or other communications with the end point device 16.

The method and system of this disclosure may be applied to different types of wireless networks including Bluetooth, Bluetooth Low Energy (BLE), WiFi, Zigbee, Near Field Communication (NFC), and others.

When the initialization and configuration procedure is started, each wireless end point device 16 will be emitting a configuration message. In one example, the configuration message is emitted at approximately 2-10 times a second and in a further example is 5 times a second. As part of the BLE packet or other wireless packet, this message will include certain information such as an identifier of the end point device 16 configured to authenticate itself as a member of the network, as well as giving the mobile wireless device an estimated RSSI. The identifier in one example is used to filter out wireless devices not intended to be a part of the network 20. As the operator or moveable unit 12 moves within the proximity of each of the end point devices 16, the wireless mobile device 14 will intercept the broadcast from the end point device 16 emitting a message within the proximity threshold. Utilizing the packet's identifier, mobile wireless device 14 will register the correct end point devices 16 as end point controllers on the network 20 and begin the address configuration process, ignoring any end point devices that do not match the accepted identifier.

Once an end point device 16 is registered with the mobile wireless device 14, the mobile wireless device 14 stores collected RSSI internally. In one example the collected RSSI data is averaged over a count of the message receptions. As long as a controller 16 hasn't been assigned a spot in the line, it will continuously send out the RSSI signals. While the operator or moveable unit 12 moves closer to the first controller 16, the average signal strength will increase to a threshold signifying the separation is within a threshold distance, for example, 2 feet or less. Once this threshold is met, the authentication is indicated. In one example the authentication is a light on both the end point device controller 16 and the mobile wireless device 14 that will illuminate signifying a connection has been made. Other examples of connectivity indication include audio, vibration or visual indicators.

When the connection is made, the mobile wireless device 14 gives the end point device controller 16 its place in line in the network 20 and then disconnects. The end point device controller 16 in one example illuminates a specific color pertaining to its place in line and ceases to broadcast configuration messages. In one embodiment, the end point device controller 16 starts to look for a message from the main controller 18. The wireless mobile device 14 in one embodiment will then increment the address counter from 1 to 2.

The operator or moveable unit 12 will then proceed along the network 20 of end point devices 16 as depicted by arrow 24 to place the wireless mobile device 14 in close proximity to each end point device 16. The order in one example is sequential. This process continues down the line until all the end point devices 16 have been configured with an address in the network 20. In one embodiment, after the last end point device 16 is configured, the operator would press a button on the wireless mobile device to stop the auto-addressing function. Once all the end point device controllers 16 are configured, they will receive a probe from the main controller 18 of the network 20 to register their credentials within a configuration table. The table contains the type, positional data, address in the network, and any relevant information pertaining to the identification and functionality of each end point device 16.

In addition to configuring the address of the device, other types of configuration information may be transmitted from the mobile device to the end device including security keys and personality traits. Examples of such items might be ceiling lights and sidewall lights, or a center versus side seating sections. A light that is in the ceiling may react differently to scene commands than a side wall light. A center section overhead controller may service four seats while a side section controller may service three seats. During the process of assigning address and location to end devices each end device is also assigned with its individual personality and security settings.

The above steps are repeated until each of the plurality of end point devices is configured with a network address and other parameters. Therefore, the initialization and configuration approach defined in this disclosure will install configuration settings to each end device at the same time that it is assigning address and location.

In one embodiment of an aircraft example, the process of addressing a large number of end point devices distributed in a column down the length of an aircraft could be performed very quickly, limited only by the speed at which the operator can walk down the fuselage. Also this approach is error free since the mobile wireless device 14 and end point device wireless controllers 16 will automatically assign addresses during the process. The operator only needs to initiate the process and then terminate the process at the end.

Figure 2:
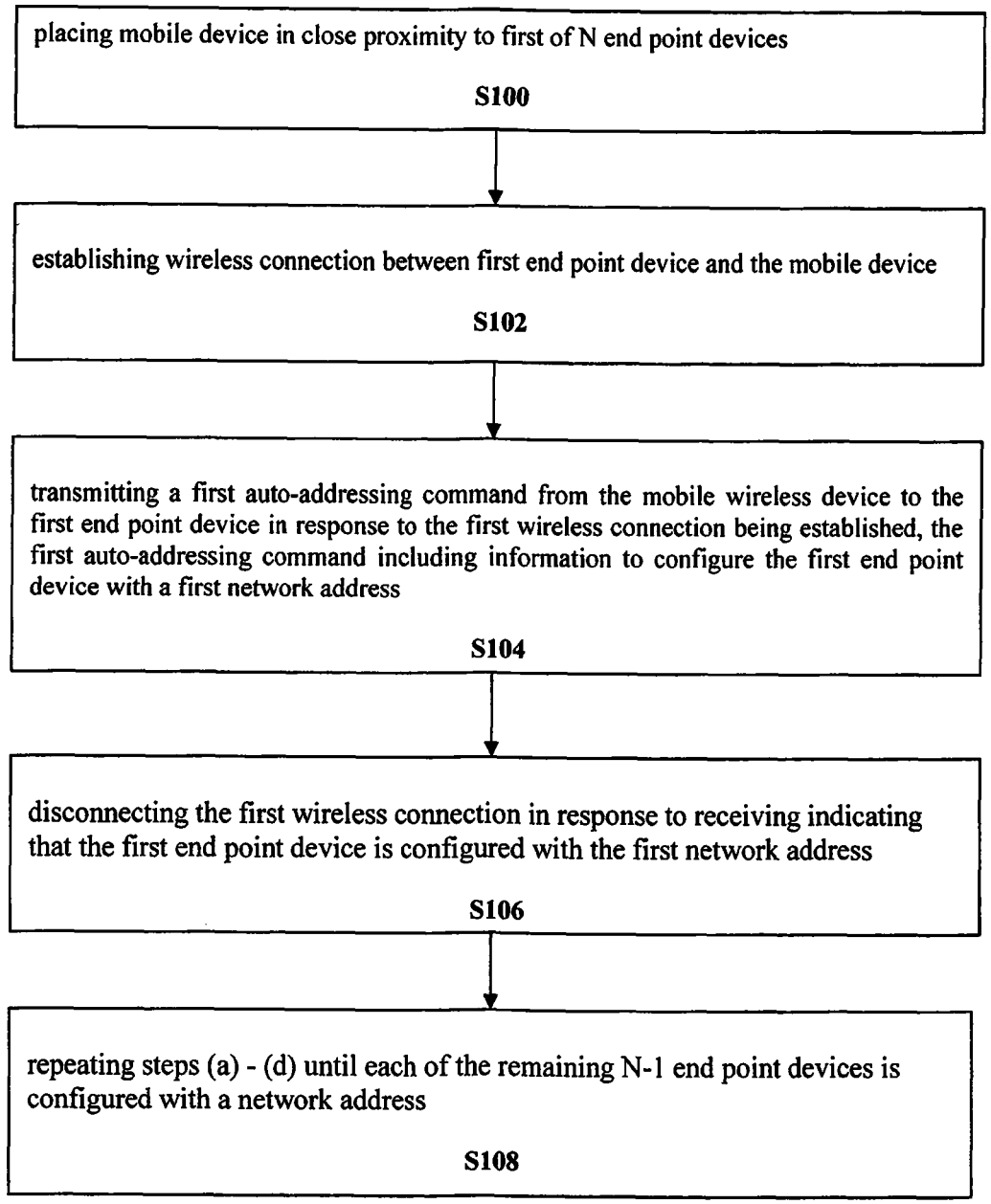
FIG. 2 is a flow diagram of one embodiment of a method of configuring network addresses of wireless end point devices using a mobile wireless device, in accordance with certain of the embodiments disclosed herein.

Turning now to FIG. 2, there is shown a flow diagram of one embodiment of a computer implemented method for assigning addresses to a plurality of end point devices in a network. In accordance with the method, step S100 is placing a mobile wireless device in close proximity to a first end point device of N end point devices, N being a number greater than 1. Step S102 is establishing a first wireless connection between the first end point device and the mobile wireless device. Step S104 is transmitting a first auto-addressing command from the mobile wireless device to the first end point device in response to the first wireless connection being established, the first auto-addressing command including information to configure the first end point device with a first network address. Step S106 is disconnecting the first wireless connection in response to receiving indicating that the first end point device is configured with the first network address. Step S108 is repeating steps S100-S106 until each of the remaining N−1 end point devices is configured with a network address.

In one embodiment of the computer implemented method of FIG. 2, each of the N end point devices is assigned a sequential address in the network according to a sequential order of the wireless connections between the mobile wireless device and each of the N end point devices. In another embodiment of the computer implemented method of FIG. 2, the sequential address in the network of each of the N end point devices includes information identifying a position of each of the N end point devices with respect to each other in the network. In one embodiment of the computer implemented method of FIG. 2, the mobile wireless device increments an address counter after each of the N end point devices is assigned a sequential address in the network.

In another embodiment of the computer implemented method of FIG. 2, step S104 of transmitting each of the auto-addressing commands includes monitoring a wireless signal strength between the wireless mobile device and each respective end point device and transmitting each of the auto-addressing commands in response to the wireless signal strength being greater than a threshold. In one embodiment of the computer implemented method of FIG. 2, the monitoring a wireless signal strength between the wireless mobile device and each respective end point device includes monitoring an RSSI level, determine an average RSSI level over time and transmitting each of the auto-addressing commands in response to the average RSSI level being greater than the threshold.

In another embodiment of the computer implemented method of FIG. 2, each of the wireless connections is established based on a wireless signal transmitted between the wireless mobile device and each respective end point device having an identifier unique to each respective end point device.

In one embodiment, the system 10 device will also provide features to enable security on the network 20. In one embodiment, the wireless mobile device 14 and the end point devices 16 store encryption keys. In one embodiment, the encryption keys will be stored in fusable, non-changeable, and non-readable memory of each device at the time of manufacture. During the address configuration procedure, the wireless mobile device 14 and the end point devices 16 on the network 20 will verify their identities and authenticate themselves as an approved device. In another embodiment, custom encryption keys will be generated and distributed to the end point devices that are unique to a specific aircraft.

Figure 3:
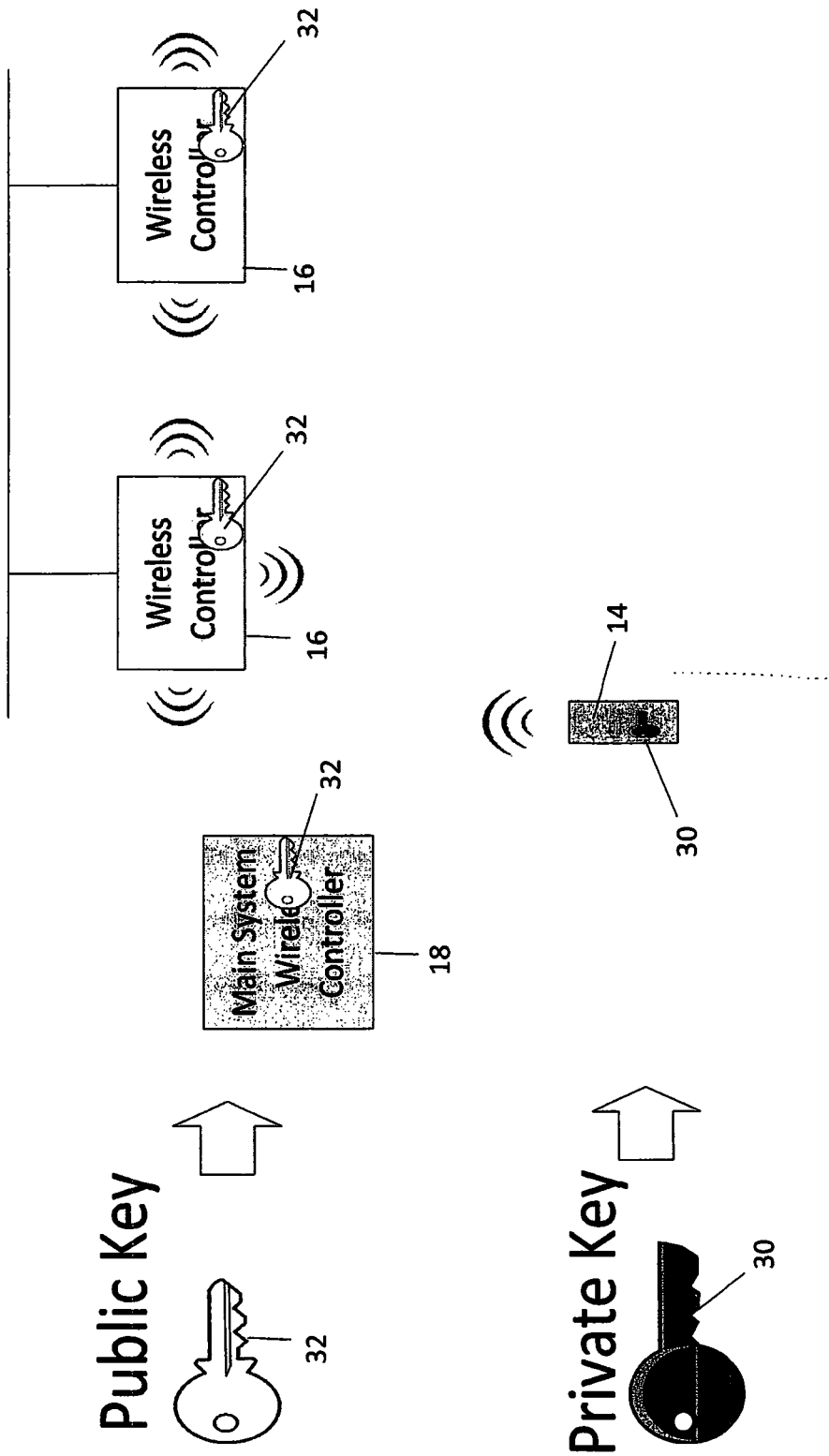
FIG. 3 illustrates a public and private key schema, in accordance with certain of the embodiments disclosed herein.

Referring to FIG. 3, in one embodiment, each of the devices manufactured for the wireless control network 20 will have keys installed at time of manufacture or during a subsequent key install process. In one embodiment, a public/private key pair will be employed, in which the mobile wireless device 14 will contain the private key 30, while the end point devices 16 and the main controller 18, embedded in the vehicle such as an aircraft, will contain public keys 32. The private key 30 in the mobile wireless device 14 will be used to un-lock all end point devices 16 that are to be attached to a vehicle.

Each time the main system controller 18 or a wireless end point controller 16 communicates with the wireless mobile device 14, the devices shall authenticate each other through the use of key exchanges. The wireless end point controllers 16 will generate a message using its local public key and send it to the mobile wireless device 14. Only the mobile wireless device 14 will be able to decrypt the message using its private key 30. Once the message is decrypted the mobile wireless device 14 will be able to verify the identity of the end point controller 16 as an approved end point device. The mobile wireless device 14 will also reply to the wireless end point controller 16 with an encrypted message such that the wireless end point controller 16 can authenticate with the mobile wireless device 14.

Figure 4:
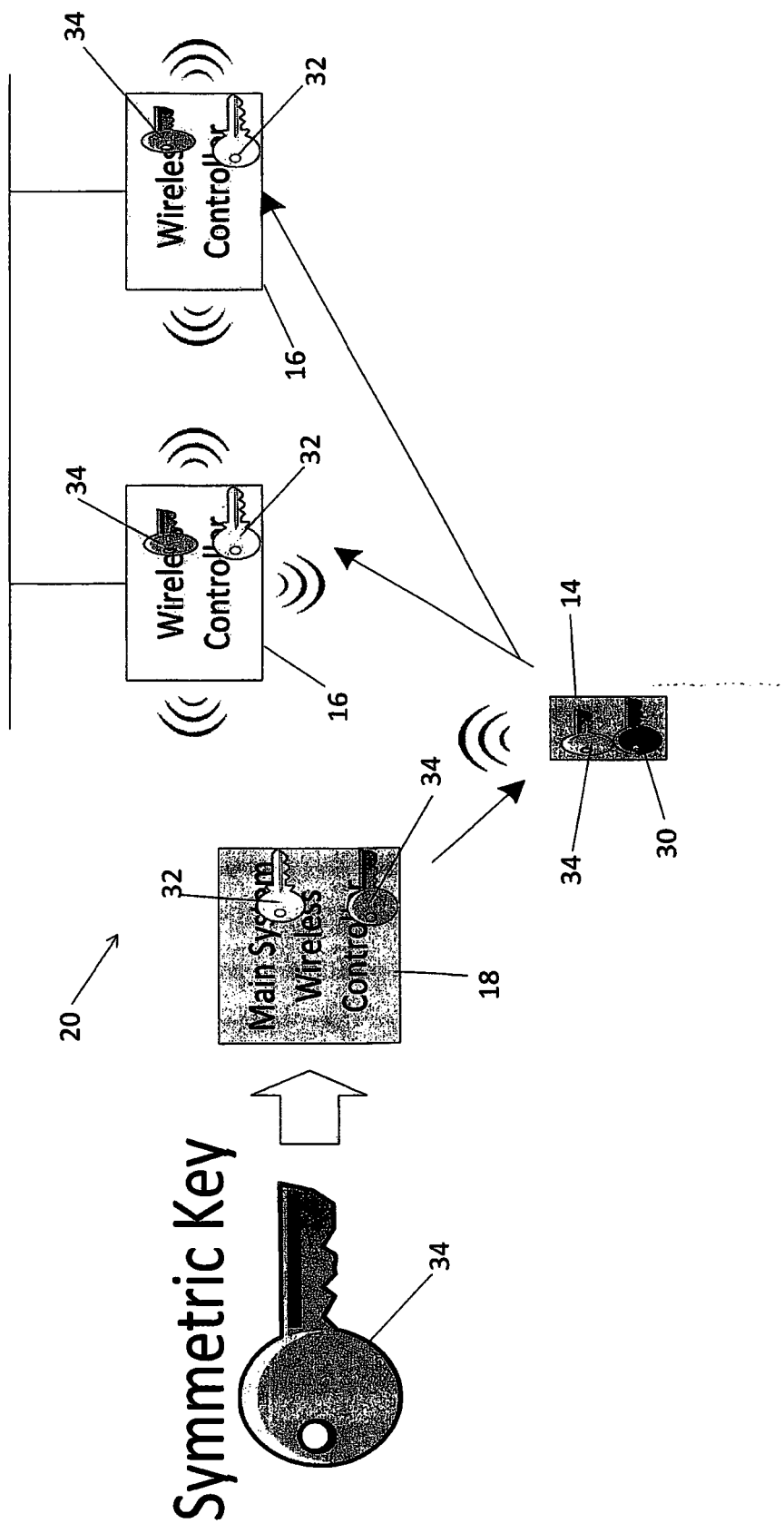
FIG. 4 illustrates another public and private key schema, in accordance with certain of the embodiments disclosed herein.

Referring to FIG. 4, in another embodiment, the mobile wireless device 14 will also initialize unique encryption keys for each vehicle. This may be in addition to the public/private key pair 30/32. Prior to configuration of the end point devices 16, the mobile wireless device 14 will coordinate with the main controller 18 to establish the per-vehicle unique encryption key. This key shall be a symmetric key 34 to enable fast processing of system control messages.

Prior to configuring the end point devices 16, the mobile wireless device 14 will communicate with the main system controller 18. During this communication, the main system controller 18 will generate a random symmetric key 34 and fuse it into its secure memory. The main system controller 18 will also encrypt the symmetric key 34 and securely transfer it to the mobile wireless device 14. The mobile wireless device 14 will store the key temporarily to be used only during the configuration process of the specific vehicle.

As each end point device 16 is configured for position in the network, the mobile wireless device 14 can also provide to each end point device 16 the symmetric encryption key 34 that will be utilized for secure communications on the network 20. The encryption keys 34 will provide the system on each vehicle with unique secure communication credentials and prevent networks on two different systems from accidentally communicating with each other. The wireless end point controllers 16 will fuse the encryption keys 34 into their secure data storage registers.

The mobile wireless device 14 thereby provides a physical secure key to manage security of the wireless network 20. The vehicle such as an aircraft OEM, airline, and equipment manufacturer can physically secure the mobile wireless device 14 and utilize it to provide for secure updates to the system. This prevents the need to remember and manage passwords, and thereby prevent unauthorized disclose of passwords.

Once such a system is fielded, it may be necessary to replace individual end point devices 16 that have failed or for other maintenance reasons. It would be undesirable to have to require the mobile wireless device 14 to configure the replaced device in such situations since the vehicle or platform may be at a remote location. In one embodiment, the system 10 is designed with a special maintenance mode. In the special maintenance mode, a single end point device 16 in the network 20 can be replaced without the use of mobile wireless device 14. The replacement process may be controlled from the main controller 18, which may include a main user interface of the system 10. The main user interface of main controller 18 is used to specify which end point device 16 is being replaced and command the system into configuration mode.

In this configuration maintenance mode, the two end point devices 16 closest to the new replacement end point device will enter a listening mode, and will listen for the replacement end point device to get powered up. Once the new end point device is installed and powered up, the two end point devices 16 in its closest proximity will act as the mobile wireless device, and enable the new end device to join the network in the same way that the wireless mobile device would act.

In various embodiments, system 10 may be implemented as a wireless system that may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth.

Figure 5:
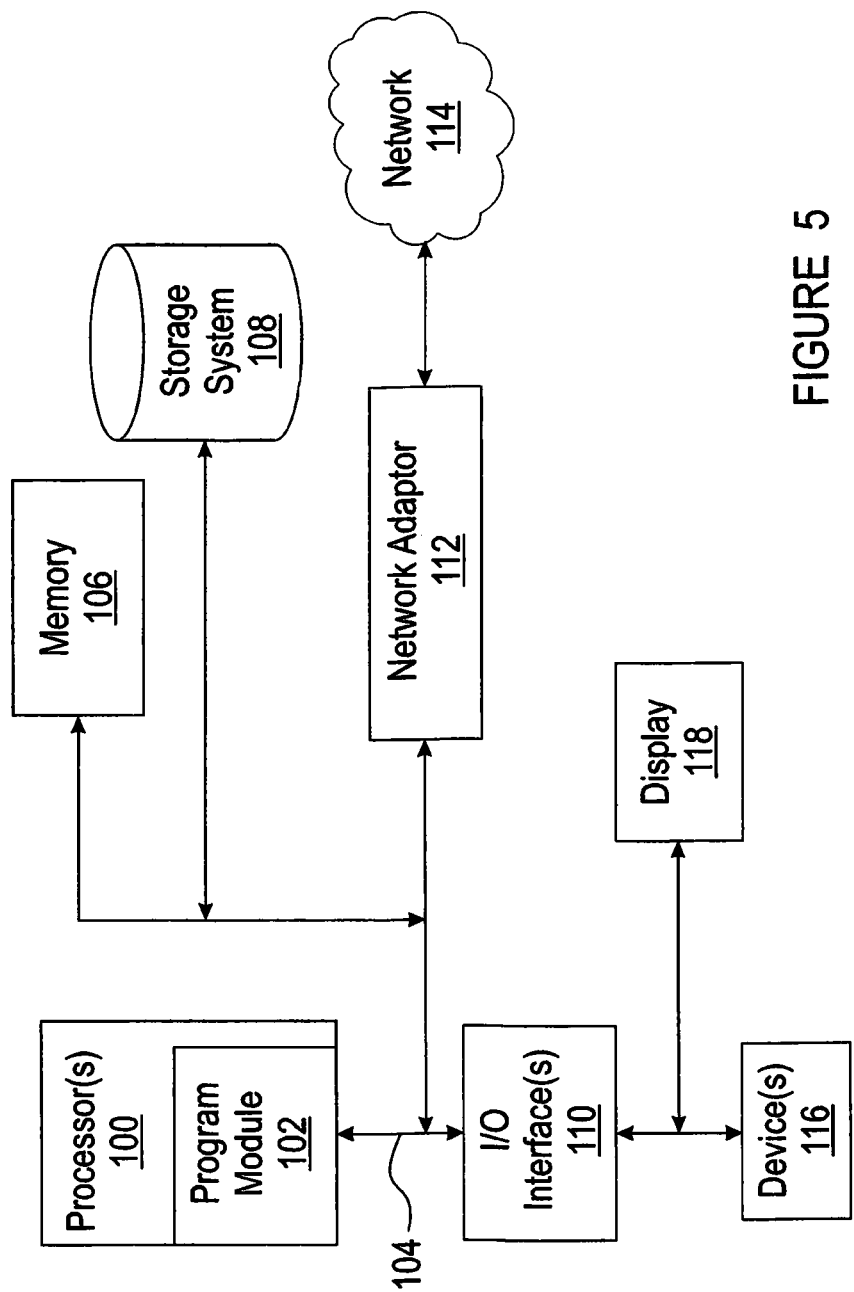
FIG. 5 is a block diagram of an exemplary computing system suitable for implementation of the embodiments of the invention disclosed in this specification.

FIG. 5 illustrates a schematic of an example computer or processing system that may implement the method for network address configuration in one embodiment of the present disclosure. The computer system is only one example of a suitable processing system that may be used to implement the mobile wireless device 14, end point devices 16 and main controller 18 and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

The computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, the computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

In one embodiment, the method and system disclosed herein is configured for the initialization of end devices in an aircraft cabin management system. In the cabin management system, a central controller interfaces with indicators and buttons at specific seat locations, color controlled LED lights at different locations (ceiling, sidewall, lavatory), speakers, electronically controlled stow bins, electronically dimmable windows and other devices. All of these devices may be wirelessly controlled.

The end devices need to be initialized with specific settings. The controller needs to communicate with the end-point devices that are located at specific locations in the cabin and therefore each end device needs a unique address. The controller also needs to broadcast messages to specific types of units and therefore each unit needs to have a unique personality. The end devices need security keys to authenticate on a specific aircraft's network.

The technicians building the aircraft select generic items and install them in specific locations. Devices ship from the factory in a generic state and are installed for use on a specific end customer (airlines) aircraft. During the installation and setup of an aircraft on the manufacturing line, the method and system disclosed herein utilizes a handheld device and the proximity based approach. The handheld device allows the operator to easily select the type of device to be initialized, the personality, and the security key. The operator then initiates the configuration process on the tablet by touching the appropriate control. The operator than walks down the cabin from front to back and places the handheld near each device in order. The handheld device monitors its wireless interface looking for an appropriate type of device to come in-range. When it finds such a device it makes a connection to the device and transfers to the device the appropriate initialization parameters. The wireless device keeps track of the number of devices that have been initialized and thereby initializes each end device that it encounters with the next location address. After initializing and disconnecting from a device it provides the operator with feedback indicating that the initialization is complete. The operator then moves to the next device in the line and repeats the process all the way to the rear of the aircraft. Once all the devices in the line have been initialized, the operator can command the wireless device that the initialization process is complete.

Once all the devices in the aircraft have been initialized they can communicate back to the main controller to inform the main controller of their specific details. Another approach would be to allow the wireless device to automatically transfer the results of the initialization process to the main controller.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the network address configuration methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other components and functionality not reflected in the illustrations will be apparent in light of this disclosure, and it will be appreciated that other embodiments are not limited to any particular hardware or software configuration. Thus in other embodiments system may comprise additional, fewer, or alternative subcomponents as compared to those included in the example embodiments.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments disclosed herein. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure not be limited by this detailed description, but rather by the claims appended hereto. Future filed applications claiming priority to this application may claim the disclosed subject matter in a different manner, and may generally include any set of one or more elements as various disclosed or otherwise demonstrated herein.

What is claimed is:

1. A computer implemented method for assigning configuration parameters to a plurality of end point devices in a network, comprising:
   (a) placing a mobile wireless device in close proximity to an end point device of N end point devices, N being a number greater than 1;
   (b) establishing a wireless connection between the close proximity end point device and the mobile wireless device;
   (c) transmitting an auto-addressing command from the mobile wireless device to the close proximity end point device in response to the wireless connection being established, the auto-addressing command including information to configure the close proximity end point device with a unique network address;
   (d) transmitting other initialization information from the mobile device to the close proximity end point device;
   (e) disconnecting the wireless connection in response to receiving a signal indicating that the close proximity end point device is configured with the unique network address;
   (f) repeating steps (a)-(e) until each of the remaining N−1 end point devices is configured with a respective unique network address;
   (g) registering the respective unique network addresses of each of the N end point devices in a network configuration table;
   (h) establishing a public/private key encryption protocol in the wireless signal communication between the wireless mobile device and each respective end point device; and
   (i) establishing an encryption key unique to a set of the N end point devices located in a single vehicle.

2. The computer implemented method of claim 1, wherein each of the N end point devices is automatically assigned a sequential address in the network according to a sequential order of the wireless connections between the mobile wireless device and each of the N end point devices as the mobile wireless device is moved along the network.

3. The computer implemented method of claim 2, wherein the sequential address in the network of each of the N end point devices includes information identifying a position of each of the N end point devices with respect to each other in the network.

4. The computer implemented method of claim 2, wherein the mobile wireless device increments an address counter after each of the N end point devices is assigned a sequential address in the network.

5. The computer implemented method of claim 1, wherein transmitting each of the auto-addressing commands includes monitoring a wireless signal strength between the wireless mobile device and each respective end point device and transmitting each of the auto-addressing commands in response to the wireless signal strength being greater than a threshold.

6. The computer implemented method of claim 5, wherein monitoring a wireless signal strength between the wireless mobile device and each respective end point device includes monitoring an RSSI level, determine an average RSSI level over time and transmitting each of the auto-addressing commands in response to the average RSSI level being greater than the threshold.

7. The computer implemented method of claim 1, wherein each of the wireless connections is established based on a wireless signal transmitted between the wireless mobile device and each respective end point device having an identifier unique to each respective end point device.

8. The computer implemented method of claim 1, further comprising replacing one of the N end point devices with a new end point device, and wherein at least one of the N end point devices in closest proximity to the new end point device performing steps (b)-(e) to enable the new end point device to join the network.

9. The computer implemented method of claim 2, further comprising selecting configuration information for the end point devices to assign personality traits for the end devices.

10. A system for assigning addresses to a plurality of end point devices in a network, comprising:
    a wireless mobile device;
    N end point devices, N being a number greater than 1; and
    a main controller;

the wireless mobile device comprising one or more computer processors, one or more non-transitory computer-readable storage media and program instructions, stored on the one or more non-transitory computer-readable storage media, which when implemented by the one or more processors, cause the wireless mobile device to perform the steps of:
(a) establishing a wireless connection between an end point device of the N end point devices and the mobile wireless device in response to the mobile wireless device being in close proximity to the end point device;
(b) transmitting an t auto-addressing command from the mobile wireless device to the close proximity end point device in response to the wireless connection being established, the auto-addressing command including information to configure the close proximity end point device with a unique network address;
(c) disconnecting the wireless connection in response to receiving a signal indicating that the close proximity end point device is configured with the unique network address; and
(d) repeating steps (a)-(c) until each of the remaining N−1 end point devices is configured with a respective unique network address;
the N end point devices storing the respective unique network address; and
the main controller being configured to establish communication with each of the N end point devices and to register the respective unique network addresses of each of the N end point devices in a network configuration table in response to receiving a signal that all of the N end point devices have been configured with a respective unique network address.

11. The system of claim 10, wherein each of the N end point devices is automatically assigned a sequential address in the network according to a sequential order of the wireless connections between the mobile wireless device and each of the N end point devices as the mobile wireless device is moved along the network.

12. The system of claim 11, wherein the sequential address in the network of each of the N end point devices includes information identifying a position of each of the N end point devices with respect to each other in the network.

13. The system of claim 11, wherein the mobile wireless device increments an address counter after each of the N end point devices is assigned a sequential address in the network.

14. The system of claim 10, wherein transmitting each of the auto-addressing commands includes monitoring a wireless signal strength between the wireless mobile device and each respective end point device and transmitting each of the auto-addressing commands in response to the wireless signal strength being greater than a threshold.

15. The system of claim 14, wherein monitoring a wireless signal strength between the wireless mobile device and each respective end point device includes monitoring an RSSI level, determine an average RSSI level over time and transmitting each of the auto-addressing commands in response to the average RSSI level being greater than the threshold.

16. The system of claim 10, wherein each of the wireless connections is established based on a wireless signal transmitted between the wireless mobile device and each respective end point device having an identifier unique to each respective end point device.

17. The system of claim 10, further comprising establishing a public/private key encryption protocol in the wireless signal communication between the wireless mobile device and each respective end point device.

18. The system of claim 17, further comprising establishing an encryption key unique to a set of the N end point devices located in a single vehicle.

19. The system of claim 10, further comprising replacing one of the N end point devices with a new end point device, and wherein at least one of the N end point devices in closest proximity to the new end point device performing steps (a)-(c) to enable the new end point device to join the network.

20. The system of claim 10, wherein the mobile wireless device is configured to send a beacon signal for establishing the wireless connection between the wireless mobile device and each respective end point device.

21. The system of claim 10, wherein each N end point device is configured to send a beacon signal for establishing the wireless connection between the wireless mobile device and each respective end point device.

22. The computer system of claim 10, wherein the mobile wireless device enables a user to select configuration information for the end point devices such that personality traits for the end devices can be assigned.

23. A computer program product comprising:
program instructions on a non-transitory computer-readable storage medium, where execution of the program instructions using a computer causes a mobile wireless device to perform a method for assigning addresses to N end point devices in a network, N being a number greater than 1, comprising:
(a) establishing a wireless connection between an end point device of the N end point devices and the mobile wireless device in response to the mobile wireless device being in close proximity to the end point device;
(b) transmitting an auto-addressing command from the mobile wireless device to the close proximity end point device in response to the wireless connection being established, the auto-addressing command including information to configure the close proximity end point device with a unique network address;
(c) disconnecting the wireless connection in response to receiving a signal indicating that the close proximity end point device is configured with the unique network address;
(d) repeating steps (a)-(c) until each of the remaining N−1 end point devices is configured with a respective unique network address;
(e) registering the respective unique network addresses of each of the N end point devices in a network configuration table;
(f) establishing a public/private key encryption protocol in the wireless signal communication between the wireless mobile device and each respective end point device; and
(g) establishing an encryption key unique to a set of the N end point devices located in a single vehicle.

24. The computer program product of claim 23, wherein each of the N end point devices is automatically assigned a sequential address in the network according to a sequential order of the wireless connections between the mobile wireless device and each of the N end point devices as the mobile wireless device is moved along the network.

25. The computer program product of claim 23, wherein the sequential address in the network of each of the N end point devices includes information identifying a position of each of the N end point devices with respect to each other in the network.

26. The computer program product of claim 23, wherein the mobile wireless device increments an address counter after each of the N end point devices is assigned a sequential address in the network.

27. The computer program product of claim 23, wherein transmitting each of the auto-addressing commands includes monitoring a wireless signal strength between the wireless mobile device and each respective end point device and transmitting each of the auto-addressing commands in response to the wireless signal strength being greater than a threshold.

28. The computer program product of claim 27, wherein monitoring a wireless signal strength between the wireless mobile device and each respective end point device includes monitoring an RSSI level, determine an average RSSI level over time and transmitting each of the auto-addressing commands in response to the average RSSI level being greater than the threshold.

29. The computer program product of claim 23, wherein each of the wireless connections is established based on a wireless signal transmitted between the wireless mobile device and each respective end point device having an identifier unique to each respective end point device.

30. The computer program product of claim 23, further comprising selecting configuration information for the end point devices to assign personality traits for the end devices.

31. A computer implemented method for assigning configuration parameters to a plurality of end point devices in a network, comprising:
(a) placing a mobile wireless device in close proximity to an end point device of N end point devices, N being a number greater than 1;
(b) establishing a wireless connection between the close proximity end point device and the mobile wireless device;
(c) transmitting an auto-addressing command from the mobile wireless device to the close proximity end point device in response to the wireless connection being established, the auto-addressing command including information to configure the close proximity end point device with a unique network address;
(d) transmitting other initialization information from the mobile device to the close proximity end point device;
(e) disconnecting the wireless connection in response to receiving a signal indicating that the close proximity end point device is configured with the unique network address;
(f) repeating steps (a)-(e) until each of the remaining N−1 end point devices is configured with a respective unique network address;
(g) establishing a public/private key encryption protocol in the wireless signal communication between the wireless mobile device and each respective end point device; and
(h) establishing an encryption key unique to a set of the N end point devices located in a single vehicle.

32. A computer implemented method for assigning configuration parameters to a plurality of end point devices in a network, comprising:
(a) placing a mobile wireless device in close proximity to an end point device of N end point devices, N being a number greater than 1;
(b) establishing a wireless connection between the close proximity end point device and the mobile wireless device;
(c) transmitting an auto-addressing command from the mobile wireless device to the close proximity end point device in response to the wireless connection being established, the auto-addressing command including information to configure the close proximity end point device with a unique network address;
(d) transmitting other initialization information from the mobile device to the close proximity end point device;
(e) disconnecting the wireless connection in response to receiving a signal indicating that the close proximity end point device is configured with the unique network address;
(f) repeating steps (a)-(e) until each of the remaining N−1 end point devices is configured with a respective unique network address; and
(g) replacing one of the N end point devices with a new end point device, and wherein at least one of the N end point devices in closest proximity to the new end point device performs steps (b)-(e) to enable the new end point device to join the network.

33. A computer program product comprising:
program instructions on a non-transitory computer-readable storage medium, where execution of the program instructions using a computer causes a mobile wireless device to perform a method for assigning addresses to N end point devices in a network, N being a number greater than 1, comprising:
(a) establishing a wireless connection between an end point device of the N end point devices and the mobile wireless device in response to the mobile wireless device being in close proximity to the end point device;
(b) transmitting an auto-addressing command from the mobile wireless device to the close proximity end point device in response to the wireless connection being established, the auto-addressing command including information to configure the close proximity end point device with a unique network address;
(c) disconnecting the wireless connection in response to receiving a signal indicating that the close proximity end point device is configured with the unique network address;
(d) repeating steps (a)-(c) until each of the remaining N−1 end point devices is configured with a respective unique network address; and
(e) at least one of the N end point devices in closest proximity to a new end point device performing steps (a)-(d) to enable the new end point device to join the network.

* * * * *